(12) United States Patent
Sirois

(10) Patent No.: US 6,975,201 B2
(45) Date of Patent: Dec. 13, 2005

(54) REVERSE-DIRECTION-STAPLE SYSTEM AND METHOD

(75) Inventor: Robert D. Sirois, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 10/638,073

(22) Filed: Aug. 8, 2003

(65) Prior Publication Data

US 2004/0032316 A1 Feb. 19, 2004

Related U.S. Application Data

(63) Continuation-in-part of application No. 09/682,277, filed on Aug. 13, 2001, now Pat. No. 6,847,285, and a continuation-in-part of application No. 09/682,269, filed on Aug. 11, 2001, now Pat. No. 6,722,015.

(51) Int. Cl.[7] .............................................. H01F 27/24
(52) U.S. Cl. ...................................................... 336/234
(58) Field of Search ................ 336/211–212, 216–217, 336/233–234; 310/216–217

(56) References Cited

U.S. PATENT DOCUMENTS

| | | | | |
|---|---|---|---|---|
| 5,123,155 A | * | 6/1992 | Neuenschwander | 29/596 |
| 5,894,182 A | * | 4/1999 | Saban et al. | 310/217 |
| 6,002,191 A | * | 12/1999 | Saban | 310/216 |
| 6,018,207 A | * | 1/2000 | Saban et al. | 310/217 |
| 6,722,015 B2 | * | 4/2004 | Sirois et al. | 29/596 |
| 6,847,285 B2 | * | 1/2005 | Sirois et al. | 336/234 |

* cited by examiner

Primary Examiner—Tuyen T. Nguyen
(74) Attorney, Agent, or Firm—Ohlandt, Greeley, Ruggiero & Perle, L.L.P.

(57) ABSTRACT

A reverse-direction staple system for a plurality of members to be stacked on top of one another is provided. The system includes an upwardly extending staple, a staple access hole, and a staple clearance opening defined in each member to be stacked. The upwardly extending staple of each member extends through the staple access hole of a subsequent member and forms a bent staple over the subsequent member. In addition, the bent staples are received in the staple clearance opening of a second subsequent member.

8 Claims, 4 Drawing Sheets

REVERSE-DIRECTION-STAPLE SYSTEM AND METHOD

CROSS-REFERENCE TO RELATED APPLICATIONS

This application is a continuation-in-part of U.S. application Ser. No. 09/682,269 filed on Aug. 11, 2001 now U.S. Pat. No. 6,722,015 and a continuation-in-part of U.S. application Ser. No. 09/682,277 filed on Aug. 13, 2001 now U.S. Pat. No. 6,847,285, the contents of each of which are incorporated herein by reference.

BACKGROUND OF THE INVENTION

The present disclosure relates to electric machines and more specifically to a reverse-direction-staple system and method for securing lamination plates of an electric machine to one another.

Electric machines, such as motors, generators, alternators, starter-generators, typically have a stator core and/or a rotor core formed of a plurality of stacked lamination plates. The stacked lamination plates are commonly held together along the axial dimension by welding, cleating, or conventional interlocking.

The welding and cleating methods add cost and time to the manufacturing process since these methods are performed after the lamination plates are pressed and stacked.

During conventional interlocking, each lamination plate is stamped so that an indentation is formed on one side of the plate and a protrusion extends from the opposite side of the plate. Typically, the protrusion extends in a downward direction from the lamination plates. The lamination plates are then stacked so that the downward protrusion of a first lamination plate is received in and forms an interference fit with the indentation of a subsequent lamination plate. Thus, conventional interlocked lamination plates can be formed during the pressing and stacking operation and, thus can be less costly than other methods.

However, the conventional interlocked lamination plates can form a core that is "spongy" or breaks apart during subsequent manufacturing operations, which has limited the height of the stack. Additionally, the conventional interlocked lamination plates require extreme accuracy and tolerances in the punching operation, which can add cost and complexity to the manufacturing process. For example, the position of the interlocking protrusion and indentation between the subsequent lamination plates must be very accurate in order to ensure the required interference fit. In addition, the tolerances between the punch and the die require extreme close punch to die clearance (e.g., conventional interlock requires about 0.0002 inches clearance) in order to ensure the required interference fit. Moreover, the position and number of the interlocking protrusion/indentations can cause eddy currents in the electric machine, which reduces the efficiency of the electric machine.

Accordingly, there is a continuing need for methods of stamping lamination plates of an electric machine and securing those plates to one another and products formed thereby that eliminate one or more of the aforementioned drawbacks and deficiencies of the conventional methods. Moreover, there is a continuing need for methods of stamping and securing lamination plates to form a tightly secured stack as the lamination plates are being assembled in the stamping process.

SUMMARY OF THE INVENTION

A reverse-direction staple system for a plurality of members to be stacked on top of one another is provided. The system includes an upwardly extending staple, a staple access hole, and a staple clearance opening defined in each member to be stacked. The upwardly extending staple of each member extends through the staple access hole of a subsequent member and forms a bent staple over the subsequent member. In addition, the bent staples are received in the staple clearance opening of a second subsequent member.

A lamination plate for an electric machine is provided. The lamination plate has a staple access hole and a staple clearance opening. The lamination plate can be stacked on a previous lamination plate so that the staple access hole receives a first staple of the previous lamination plate and the staple clearance opening receives a second staple bent over the previous lamination plate. In some embodiments of the lamination plate, a third staple extends from the lamination plate.

A core for an electric machine is also provided. The core includes a first lamination plate, a second lamination plate, and a third lamination plate. The first lamination plate has a first staple, the second lamination plate has a second staple and a second hole, and the third lamination plate has a third hole and a third opening. The second lamination plate is stacked on the first lamination plate such that the first staple is positioned through the second hole and is bent over the second lamination plate to secure the first and second lamination plates to one another. The third lamination plate is stacked on the second lamination plate such that the second staple is positioned through the third hole and is bent over the third lamination plate to secure the second and third lamination plates to one another and such that the first staple that is bent over the second lamination plate is received in the third opening.

A method of forming a core of an electric machine is also provided. The method includes stamping a first lamination from a blank so that the first lamination has a first staple in a first position, a second opening in a second position, and a third hole in a third position; and stamping a second lamination from the blank so that the second lamination has a first hole in the first position, a second staple in the second position, a third opening in the third position; stamping a third lamination from the blank so that the third lamination has a first opening in the first position, a second hole in the second position, and a third staple in the third position.

The above-described and other features and advantages of the present invention will be appreciated and understood by those skilled in the art from the following detailed description, drawings, and appended claims.

DETAILED DESCRIPTION OF THE INVENTION

Figure 1:
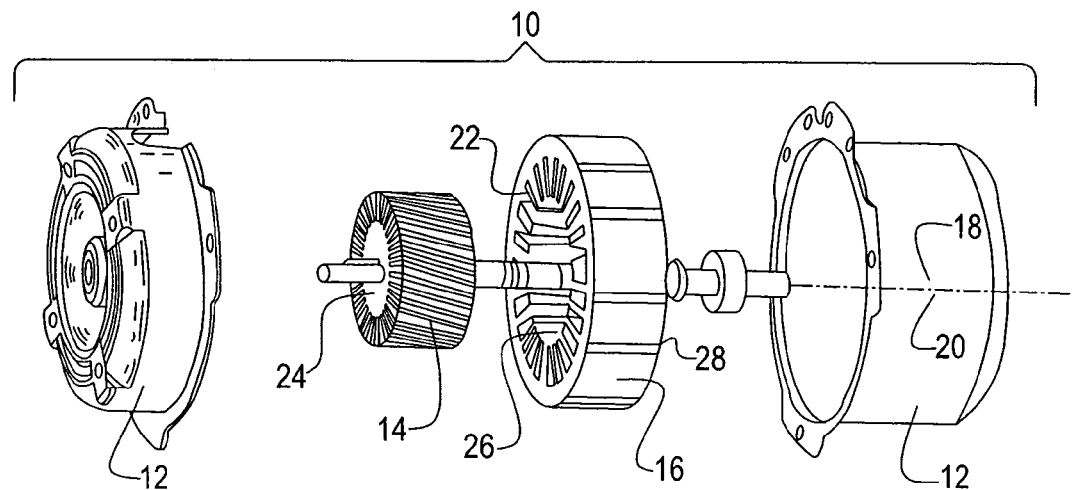
FIG. 1 is an exploded, perspective view of an exemplary electric machine.

Referring to the drawings and in particular to FIG. 1, there is shown an electric machine generally illustrated by reference numeral 10. Electric machine 10 can be a motor, a generator, an alternator, a starter-generator, a motor-generator, and others. It should be recognized that various components of electric machine 10 have been omitted from FIG. 1 for purposes of clarity.

Electric machine 10 can include a housing 12 having a rotor 14 and a stator 16 disposed therein. In the illustrated example, stator 16 is the stationary portion of electric machine 10 that is mounted to and within housing 12. Rotor 14 is the rotating portion of electric machine 10 that is positioned for rotation within stator 16.

Stator 16 defines a first longitudinal axis 18, while rotor 14 defines a second longitudinal axis 20. Rotor 14 is positioned in stator 16 such that the axes 18, 20 of the rotor and the stator are collinear so that an air gap 22 is defined therebetween. Gap 22 permits rotor 14 to freely rotate within stator 16 without the rotor and the stator inadvertently contacting one another. In a typical, small, fractional electric machine, e.g., less than one horsepower, gap 22 can be about ten thousandths of an inch (10 mils).

Rotor 14 includes a rotor core 24 and stator 16 includes a stator core 26. Cores 24, 26 are each formed of a plurality of plates or laminations 28 that are stacked together, one on another.

Figure 2:
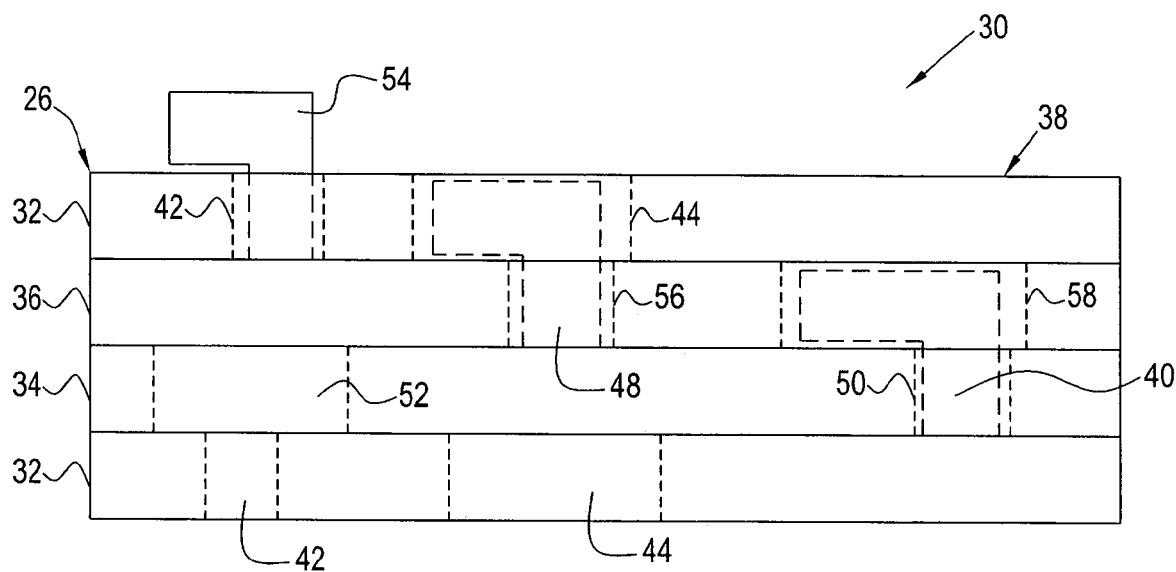
FIG. 2 is a partial side view of an exemplary embodiment a stator core secured together by an exemplary embodiment of a reverse-direction-staple system according to the present disclosure.
Figure 3:
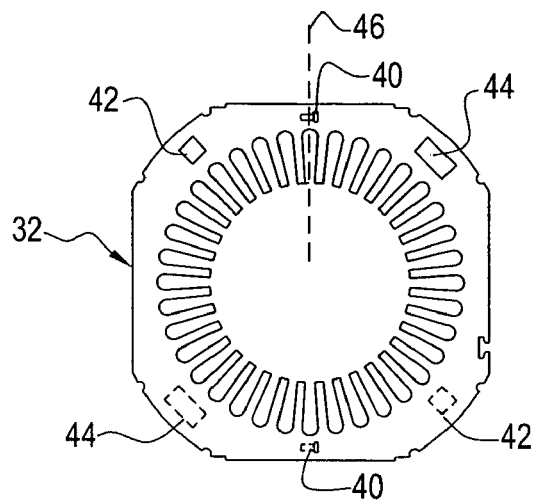
FIGS. 3 through 6 are top views of exemplary embodiments the first, second, third, and fourth laminations illustrated in FIG. 2.
Figure 4:
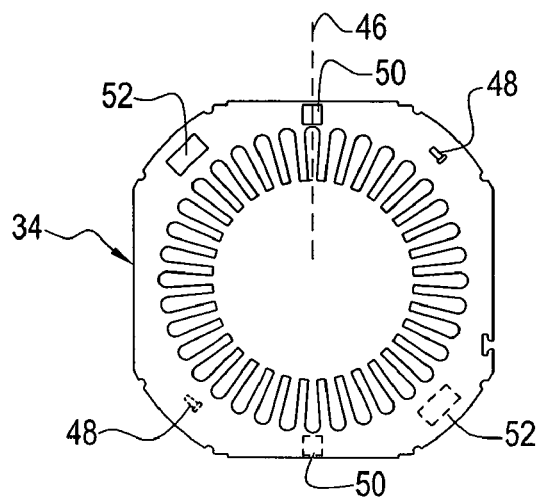
Figure 5:
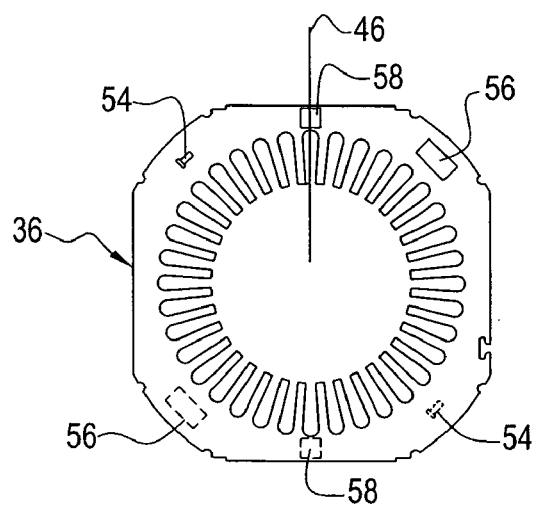
Figure 6:
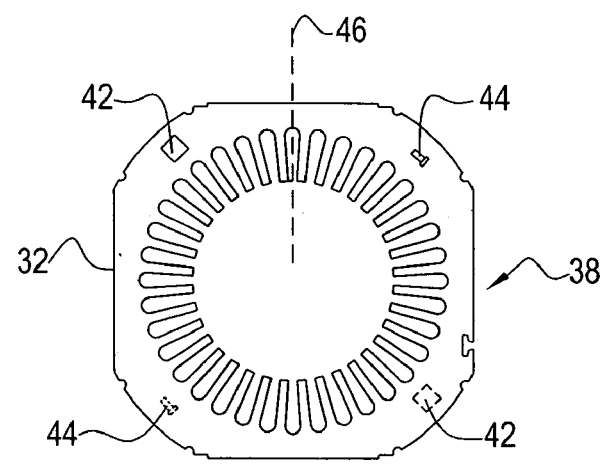

Laminations 28 are secured in place relative to one another by a reverse-direction-staple system 30 illustrated in FIGS. 2–6. System 30 can be used to secure laminations 28 of rotor core 24 together as a unitary member and/or can be used to secure laminations 28 of stator core 26 as a unitary member. For purposes of clarity, system 30 is illustrated in FIG. 2 by way of example with stator core 26. Of course, it is contemplated by the present disclosure for system 30 to find equal use with rotor cores.

In addition, system 30 is illustrated in FIG. 2 having four laminations 28. Of course, it is contemplated by the present disclosure for system 30 to have more or less than four laminations 28, with a minimum of two laminations being contemplated.

In an exemplary embodiment, stator core 26 has a first lamination 32, a second lamination 34, a third lamination 36, and a top or terminating lamination 38. In the illustrated embodiment, terminating lamination 38 is shown by way of example as first lamination 32. Of course, it is contemplated for terminating lamination 38 to be any of the first, second, or third laminations 32, 34, 36, respectively, depending on the selected height of stator core 26.

First lamination 32 includes a staple 40, a staple access hole 42, and a staple clearance opening 44. Staple 40 extends upwards from lamination 32 (i.e., staple 40 are bent vertically upwards during the progressive stamping operation). Thus, staple 40 has a reverse direction as compared to the downward protrusions of prior interlocking tabs. Staple 40 is positioned in first lamination 32 at about zero degrees from a datum line 46.

Staple 40, hole 42, and opening 44 are all offset from one another by about sixty degrees for purposes that will become clear. In the illustrated embodiment, hole 42 is positioned in first lamination 32 at about three-hundred (300) degrees from datum line 46, while opening 44 is positioned in the first lamination at about sixty (60) degrees from the datum line.

Second lamination 34 includes a staple 48, a staple access hole 50, and a staple clearance opening 52. During assembly of stator core 26, second lamination 34 is placed over or stacked onto first lamination so that the upper surfaces of the first lamination is in contact with substantially the entire the lower surface of the second lamination. Hole 50 is sized and positioned in second lamination 34 so that as second lamination 34 is stacked on first lamination 32, hole 50 mates with and receives the upstanding staple 40 of the first lamination. Then, staple 40 is bent over second lamination 34 to secure the first and second laminations to one another.

As illustrated, hole 50 is positioned in second lamination 34 at about zero degrees from datum line 46. Again, staple 48, hole 50, and opening 52 are all offset from one another by about sixty degrees. Accordingly, staple 48 is positioned in second lamination 34 at about sixty (60) degrees from datum line 46, while opening 52 is positioned in the second lamination at about three-hundred (300) degrees from the datum line.

Third lamination 36 includes a staple 54, a staple access hole 56, and a staple clearance opening 58. Hole 56 is positioned in third lamination 36 to mate with and receive staple 48 of second lamination 34. Staple 48 is bent over third lamination 36 to secure the second and third laminations to one another. In addition, opening 58 is positioned in third lamination 36 to mate with and receive staple 40 that is bent over second lamination 34. Thus, opening 58 allows laminations 34, 36 to stack together with their surfaces in substantial contact with each other without interference from the bent staple 40.

As illustrated, hole 56 is positioned in third lamination 36 at about sixty (60) degrees from datum line 46, opening 58 is positioned at about zero (0) degrees from the datum line, and staple 54 is positioned at about three-hundred (300) degrees from the datum line.

Terminating lamination 38 is configured to form the top lamination 28 of stator core 26. As such, lamination 38 includes a staple access hole 42 and a staple clearance opening 44, but lacks the reverse-direction-staple of the prior laminations. Namely, terminating lamination 38 is not attached to any subsequent lamination and, thus, does not require staples 40, 48, or 54.

Hole 42 is positioned in terminating lamination 38 to mate with and receive staple 54 of third lamination 36. Staple 54 is bent over terminating lamination 38 to secure the third and terminating laminations to one another. In addition, opening 44 is positioned in lamination 38 to mate with and receive staple 48 that is bent over third lamination 36. Thus, opening 44 allows laminations 36, 38 to stack together with their surfaces in substantial contact with each other without interference from the bent staple 48. Again, terminating lamination 38 is illustrated as first lamination 32 and, thus, has hole 42 positioned at about three-hundred (300) degrees from datum line 46 and opening 44 at about sixty (60) degrees from the datum line.

It has been found that by alternating the position of the staples, holes, and openings from lamination to lamination ensures that the laminations can be tightly secured to one another without interference caused by the bent staples of reverse-direction-staple system 30. Reverse-direction-staple system 30 has staples with a height sufficient to extend through the holes in the subsequent lamination. In addition, system 30 includes holes with a size sufficient to receive the upstanding staple of the previous lamination, but limited in shape and/or size to prevent the staple, once bent over, from pulling though the hole and disconnecting the laminations. Further, system 30 includes openings with a size sufficient to receive the staple that is bent over the previous lamination. In this manner, reverse-direction-staple system 30 tightly secures the laminations together to form stator core 26.

It has also been found that eliminating the staple in the top lamination allows reverse-direction-staple system 30 to be used to form multiple stator cores on top of one another without being connected to each other.

It should be recognized that system 30 is described above by way of example as having one staple, hole, and opening in each lamination. In addition, system 30 is described above by way of example as having the staples, holes, and openings offset from one another by about sixty degrees. Of course, it is contemplated by the present disclosure for reverse-direction-staple system 30 to have more than one staple, hole, and opening in each lamination and/or for these components to be offset from one another by more or less than sixty degrees.

For example, it is contemplated for reverse-direction-staple system 30 to have two staples, holes, and openings in each lamination as illustrated in phantom in FIGS. 3–6. Here, the two staples are evenly spaced from one another about the circumference of the lamination. Similarly, the two holes and the two openings are also evenly spaced from one another, respectively, about the circumference of the lamination. Of course, it is also contemplated for reverse-direction-staple system 30 to have the more than one staple, hole, and opening to be unevenly spaced from one another, respectively, about the circumference of the lamination.

Figure 7:
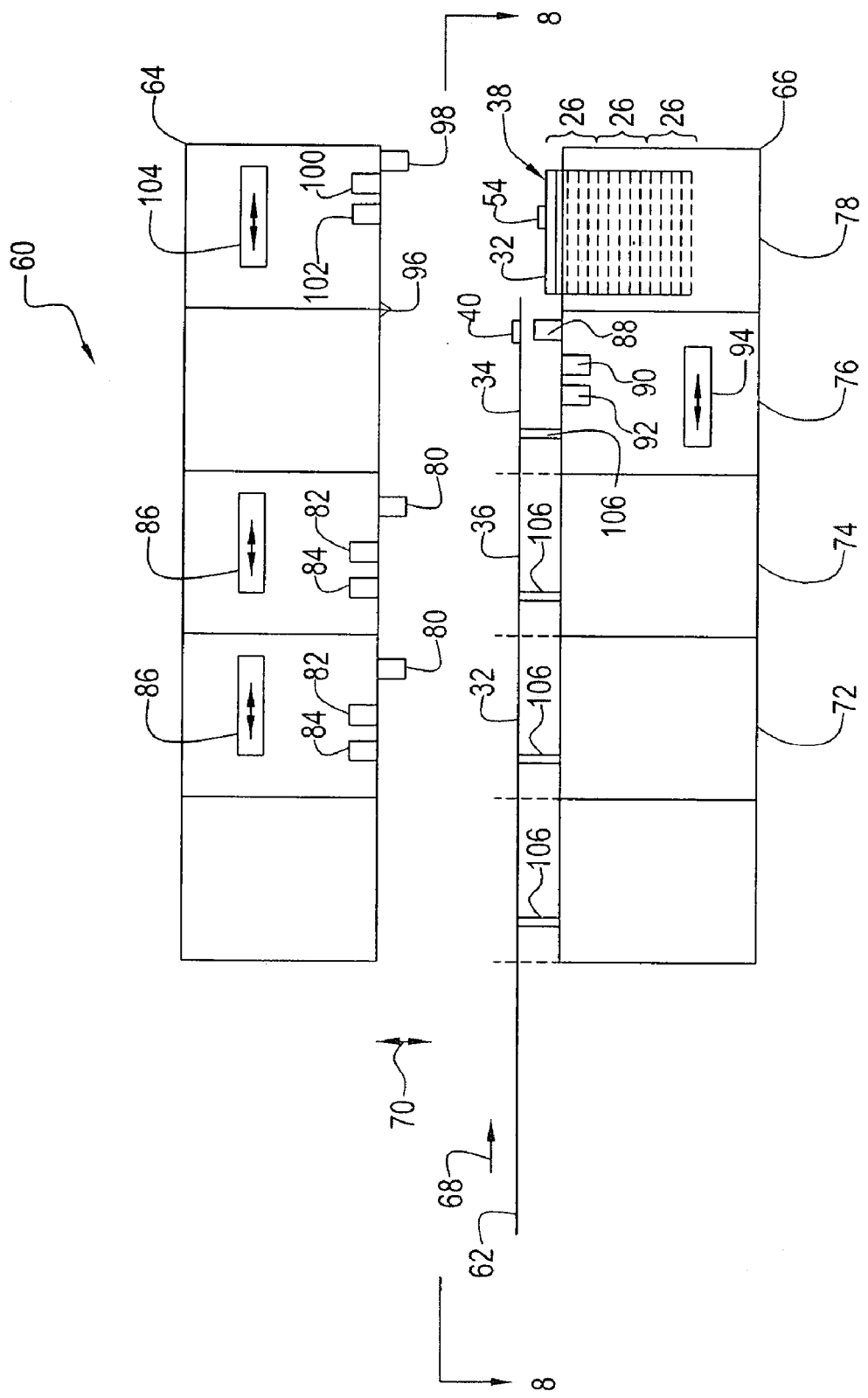
FIG. 7 is a side schematic view of exemplary method of forming the reverse-direction-staple system illustrated in FIG. 2.
Figure 8:
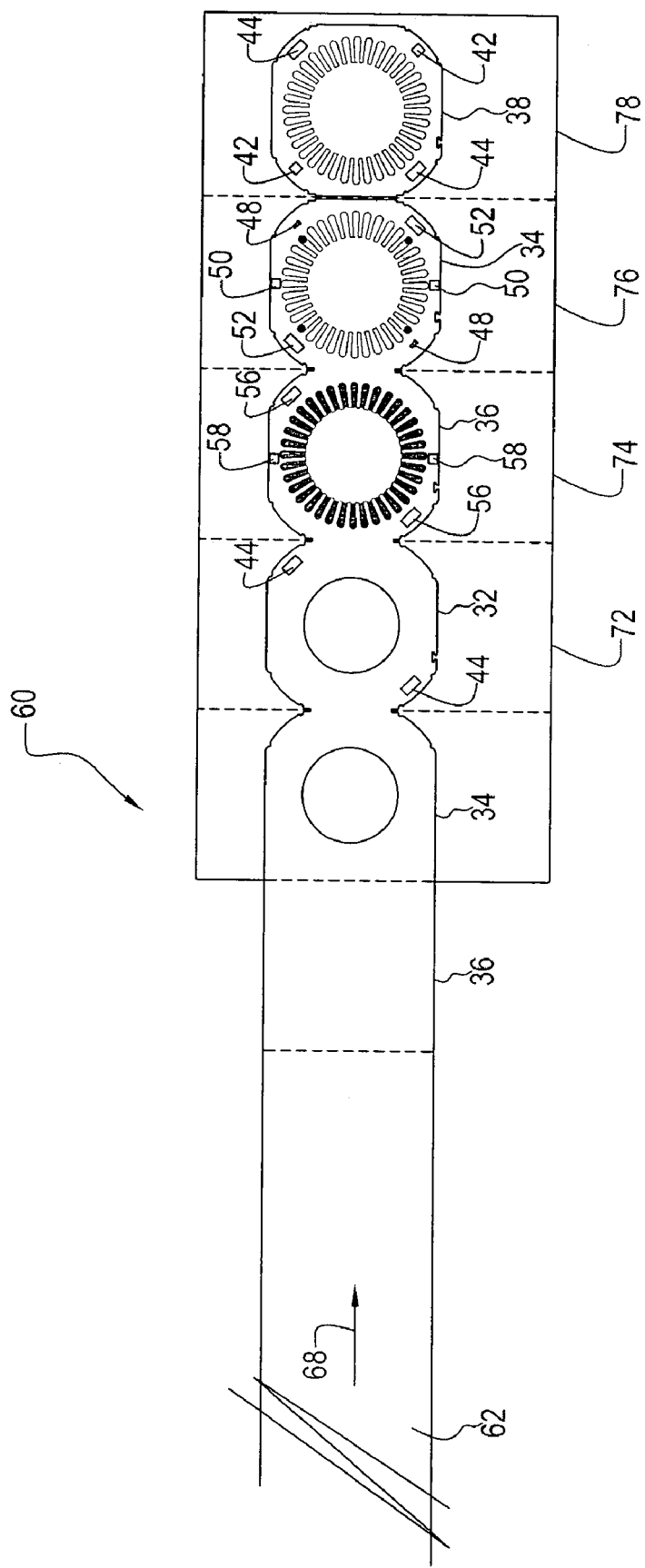
FIG. 8 is a view taken along lines 8—8 of FIG. 7.

Referring now to FIGS. 7 and 8, there is shown an exemplary embodiment of a method of manufacturing illustrated as reference numeral 60. For purposes of clarity, method 60 is illustrated by way of example as forming only stator core 26 of electric machine 10 having reverse-direction-staple system 30. Of course, it is contemplated by the present disclosure for method 60 to find equal use with the manufacture of rotor core 24 and/or with the simultaneous manufacture rotor and stator cores. It should also be recognized that method 60 omits aspects of the stamping process for laminations 28 not related to reverse-direction-staple system 30 for purposes of clarity.

Method 60 progressively stamps laminations 28 from a blank 62 to form stator core 26. Namely, method 60 stamps the laminations, stacks these laminations in a non-rotated manner, and bends the reverse-direction-staples to form stator core 26.

Method 60 indexes blank 62 between a press 64 and a die 66 in a first direction 68. In addition, press 64 and/or die 66 are configured to reciprocate in a second direction 70 to stamp laminations 32, 34, 36, 38 from blank 62. Laminations 28 are formed at number of stations, such as a first station 72, a second station 74, and a third station 76. In addition, stator core 26 is formed from laminations 28 at a fourth or stacking station 78. Method 60 is illustrated in FIG. 7 after press 64 and/or die 66 have reciprocated in second direction 70 and before blank 62 has been indexed in first direction 68.

In an exemplary embodiment, method 60 each of the first, second, and third stations 72, 74, 76, respectively, stamps a different feature (e.g., staple, hole, or opening) of reverse-direction-staple system 30. Further, first, second, and third stations 72, 74, 76 each stamp its component at the same relative position to datum line 46.

First station 72 is configured to form openings 44, 52, and 58. Thus, first station 72 can have a number of movable punches extending, preferably, from press 64. For example, first station 72 can have a first punch 80, a second punch 82, and a third punch 84.

Punches 80, 82, and 84 are configured to move between an extended position and a retracted position with respect to press 64 so that only one of the punches is extended from the press at a time.

First punch 80 can form opening 44 at the position located at the position sixty (60) degrees from datum line 46 when the first punch is extended. In addition, second punch 82 can form opening 52 at the position three-hundred (300) degrees from datum line 46, while third punch 84 can form opening 58 located on datum line 46. In the illustrated embodiment, first station 72 is shown having first punch 80 extended for formation of opening 44 in first lamination 32.

Method 60 selectively extends punches 80, 82, or 84 from press 64 by any suitable means. For example, punches 80, 82, or 84 can be extended by an automatic slide cam 86 in press 64. Cam 86 can be moved to extend one of the punches, as required. Of course, punches 80, 82, or 84 can be operated by other means such as, but not limited to, pneumatic or hydraulic cylinders.

Second station 74 is configured to form holes 42, 50, and 56. Thus, second station 74 can have a number of movable punches extending, preferably, from press 64. For example, second station 74 can have a first punch 80, a second punch 82, a third punch 84, and a slide cam 86 as described above with respect to first station 72.

At second station 74, first punch 80 can form hole 56 at the position located at the position sixty (60) degrees from datum line 46 when the first punch is extended. In addition, second punch 82 can form hole 42 at the position three-hundred (300) degrees from datum line 46, while third punch 84 can form hole 50 located on datum line 46.

In the illustrated embodiment, second station 74 is shown having first punch 80 extended for formation of hole 56 in third lamination 36. It should be recognized that opening 58 that is illustrated in third lamination 36 was formed when the third lamination was previously positioned in the first station 72.

Method 60 selectively extends punches 80, 82, or 84 from press 64 by any suitable means. For example, punches 80, 82, or 84 can be extended by an automatic slide cam 86 in press 64. Cam 86 can be moved to extend one of the punches, as required. Of course, punches 80, 82, or 84 can be operated by other means such as, but not limited to, pneumatic or hydraulic cylinders.

Third station 76 is configured to form staples 40, 48, and 54 in blank 62. Since staples 40, 48, and 54 have a reverse direction (i.e., extend upwards), third station 76 includes a number of movable lances extendable from die 66. Specifically, third station 76 includes a first lance 88, a second lance 90, and a third lance 92. Lances 88, 90, 92 are configured to move between an extended position and a retracted position with respect to die 66.

A maximum of one lance 88, 90, 92 is extended from die 66 at a time during the formation of the first, second, and third laminations 32, 34, 36, respectively. For example, first lance 88 can form staple 48 at the position located at the position sixty (60) degrees from datum line 46 when the first punch is extended. In addition, second lance 90 can form staple 54 at the position three-hundred (300) degrees from datum line 46, while third lance 92 can form staple 40 located on datum line 46.

In the illustrated embodiment, third station 76 is shown having first lance 88 extended for formation of staple 48 in second lamination 34. It should be recognized that hole 50 and opening 52 that are illustrated in second lamination 34 were formed when the second lamination was previously positioned in the first and second stations 72, 74, respectively.

Advantageously, method 60 is configured to form terminating lamination 38 having no staples. Specifically, third station 76 is also configured to prevent extension of all of the lances 88, 90, and 92 from die 66 during the formation of terminating lamination 38.

Method 60 selectively extends lances 88, 90, or 92 from die 66 by any suitable means. For example, lances 88, 90, or 92 can be extended by an automatic slide cam 94 in die 66. Cam 94 can be moved to extend none of the lances or any one of the lances, as required. Of course, lances 88, 90, or 92 can be operated by other means such as, but not limited to, pneumatic or hydraulic cylinders.

In an exemplary embodiment, method 60 forms the staple, hole, and opening in blank 64 at the first position (e.g., zero degrees) with respect to datum line 46 in a first stroke of press 66, at the second position (e.g., sixty degrees) with respect to the datum line in a second stroke of the press, and at the third position (e.g., three-hundred degrees) with respect to the datum line in a third stroke of the press.

Fourth or stacking station 78 is configured to sever laminations 28 from blank 62, stack the laminations to form stator core 26, and bend the staples to secure the stacked laminations to one another. Fourth station 78 can have a blade 96 for severing laminations 28 from blank 62. As fourth station 78 severs lamination 28, the lamination is stacked or blanked onto the previous lamination to form stator core 26.

In addition, fourth station 78 is configured to bend staples from the previous lamination over the newly inserted lamination to secure the top two laminations together. However, fourth station 78 is further configured to not bend staples located in the newly inserted lamination. Thus, fourth station 78 can have a number of movable punch inserts disposed in press 64. For example, fourth station 78 can have a first insert 98, a second insert 100, and a third insert 102.

Inserts 98, 100, and 102 are configured to move between an extended position and a retracted position with respect to press 64 so that the inserts are positioned (i.e., extended) to bend only the staples located on the previous lamination. First insert 98 can bend staple 54 at the position three-hundred (300) degrees from datum line 46 when the first insert is extended. In addition, second insert 100 can bend staple 48 at the position sixty (60) degrees from datum line 46, while third insert 102 can bend staple 40 at the position zero (0) degrees from the datum line. In the illustrated embodiment, fourth station 78 is shown having first insert 98 extended for bending of staple 54 of third lamination 36 over terminating lamination 38.

Method 60 selectively extends inserts 98, 100, or 102 from press 64 by any suitable means. For example, inserts 98, 100, or 102 can be extended by an automatic slide cam 104 in press 64. Cam 104 can be moved to extend any one of the inserts, as required. Of course, inserts 98, 100, or 102 can be operated by other means such as, but not limited to, pneumatic or hydraulic cylinders.

In the illustrated embodiment, fourth lamination 38 is illustrated positioned in fourth station 78. Again, fourth lamination 38 lacks staples. Thus, second lamination 34 can be indexed into fourth station 78 over fourth lamination 38 without being stapled thereto. In this manner, method 60 allows multiple stator cores 26 to be formed, one on top of another, in fourth station 78.

It should be recognized that the second, third, and fourth stations 74, 76, 78, respectively, are illustrated by way of example as having separate slide cams 86, 104. Of course, it is contemplated by the present disclosure for the any or all of the second, third, and fourth stations 74, 76, 78 to have a common slide cam.

Die 66 can include one or more suspension members 106. Members 106 are configured to support blank 62 above die 66 as it is moved among the stations in first direction 68. In addition, members 106 are configured to retract into die 66 as press 64 is moved in direction 70 and, thus, the members allow blank 62 to be stamped by the action of the press and the die. For example, members 106 can be spring biased from die 66.

Advantageously, members 106 suspend blank 62 above die 66 during movement in first direction 68. Suspension of blank 62 over die 66 reduces the area of contact between the blank and the die and, thus, can reduce the friction between these components. In addition, suspension of blank 62 over die 66 can ensure that the blank does not impinge on lances 88, 90, 92 extending from the die.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A core for an electric machine comprising:
   a first lamination plate having a first staple;
   a second lamination plate having a second staple and a second hole; and
   a third lamination plate having a third hole and a third opening, said second lamination plate is stacked on said first lamination plate such that said first staple is positioned through said second hole and is bent over said second lamination plate to secure said first and second lamination plates to one another, and said third lamination plate is stacked on said second lamination plate such that said second staple is positioned through said third hole and is bent over said third lamination plate to secure said second and third lamination plates to one another and such that said first staple that is bent over said second lamination plate is received in said third opening.

2. The core as in claim 1, wherein said first staple and said second staple extend in an upward direction from said first and second lamination plates, respectively.

3. The core as in claim 1, wherein said core is a rotor core or a stator core.

4. The core as in claim 1, wherein said third lamination plate further comprises a third staple.

5. The core as in claim 4, further comprising a top lamination plate having a fourth hole and a fourth opening, said top lamination plate is stacked on said third lamination plate such that said third staple is positioned through said fourth hole and is bent over said top lamination plate to secure said third and top lamination plates to one another and such that said second staple that is bent over said third lamination plate is received in said fourth opening.

6. A core for an electric machine, comprising a plurality of members stacked on top of one another, each of said plurality of members having an upwardly extending staple, a staple access hole, and a staple clearance opening, wherein said upwardly extending staple of each of said plurality of members extends through said staple access hole of a subsequent member and forms a bent staple over said subsequent member and wherein each of said bent staples is received in said staple clearance opening of a second subsequent member.

7. The core as in claim 6, wherein the core is a rotor core or a stator core.

8. The core as in claim 6, wherein each of said plurality of members has a plurality of upwardly extending staples, a corresponding plurality of staples access holes, and a corresponding plurality of staple clearance openings.

* * * * *